(12) United States Patent
Borkowski et al.

(10) Patent No.: US 9,047,159 B2
(45) Date of Patent: Jun. 2, 2015

(54) SOFTWARE INSTALLATION

(71) Applicant: International Business Machines Corporation, Armonk, NY (US)

(72) Inventors: Pawel J. Borkowski, Cracow (PL); Michal Klak, Zielonki (PL); Bartlomiej T. Malecki, Slomniki (PL)

(73) Assignee: International Business Machines Corporation, Armonk, NY (US)

( * ) Notice: Subject to any disclaimer, the term of this patent is extended or adjusted under 35 U.S.C. 154(b) by 180 days.

(21) Appl. No.: 13/673,305

(22) Filed: Nov. 9, 2012

(65) Prior Publication Data

US 2013/0125110 A1   May 16, 2013

(30) Foreign Application Priority Data

Nov. 16, 2011 (EP) .................................... 11189283

(51) Int. Cl.
*G06F 9/445* (2006.01)
(52) U.S. Cl.
CPC ........................................ *G06F 8/61* (2013.01)
(58) Field of Classification Search
CPC ........................................................ G06F 8/61
USPC ......................................................... 717/174
See application file for complete search history.

(56) References Cited

U.S. PATENT DOCUMENTS

| | | | |
|---|---|---|---|
| 6,239,800 B1 * | 5/2001 | Mayhew et al. | 715/764 |
| 7,185,334 B2 * | 2/2007 | Bourke-Dunphy et al. | 717/174 |
| 7,526,759 B2 | 4/2009 | Sanjar et al. | |
| 7,587,715 B1 * | 9/2009 | Barrett et al. | 717/176 |
| 2005/0289536 A1 | 12/2005 | Nayak et al. | |
| 2006/0123414 A1 | 6/2006 | Fors et al. | |
| 2007/0169114 A1 * | 7/2007 | Birk Olsen et al. | 717/174 |
| 2008/0201701 A1 | 8/2008 | Hofhansl et al. | |
| 2008/0244563 A1 * | 10/2008 | Sonkin et al. | 717/175 |
| 2008/0244565 A1 * | 10/2008 | Levidow et al. | 717/176 |
| 2009/0094596 A1 | 4/2009 | Kuiper et al. | |
| 2009/0113419 A1 * | 4/2009 | Ansari et al. | 717/178 |
| 2009/0150773 A1 | 6/2009 | Falkner et al. | |
| 2009/0282402 A1 | 11/2009 | Allocca et al. | |
| 2011/0202911 A1 | 8/2011 | Brooks et al. | |

OTHER PUBLICATIONS

"Advanced Installer User Guide: Creating a Professional Package"; AdancedInstaller.com website as captured by the Wayback Machine Internet Archive (archive.org) on Jul. 26, 2010.*
Paul Embrechts, "Java Presentation Frameworks JDNC and Thinlet", Departement Handelswetenschappen en Bedrijfskunde Gegradueerde in Toegepaste Informatica Programmatie en analyse, 2005.

* cited by examiner

*Primary Examiner* — Wei Zhen
*Assistant Examiner* — Clint A Thatcher
(74) *Attorney, Agent, or Firm* — Kunzler Law Group

(57) ABSTRACT

A method of installing software receives installation task data including a plurality of installation tasks. The plurality of installation tasks includes at least one user-modifiable installation task and at least one user-unmodifiable installation task. The method receives task order data defining a requisite order of execution. The method executes each of the plurality of installation tasks in accordance with the requisite order, wherein executing each user-modifiable installation task comprises altering and executing at least one installation command for the user-modifiable installation task in response to receiving a first user input.

20 Claims, 1 Drawing Sheet

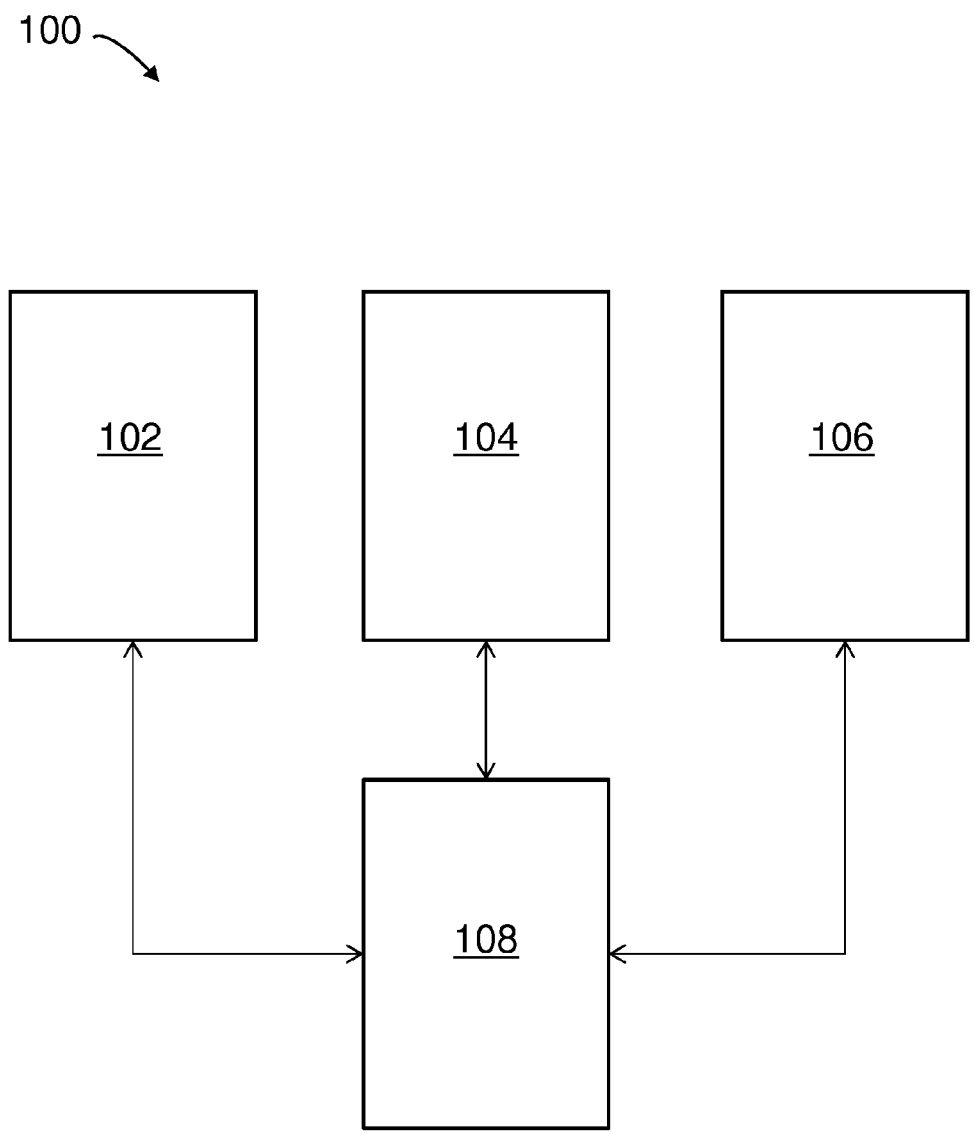

SOFTWARE INSTALLATION

CROSS-REFERENCE TO RELATED APPLICATIONS

This patent application claims priority to European Patent Office Application No. EP11189283.2 filed on Nov. 16, 2011 by International Business Machines Corporation, the entire contents of which are incorporated herein by reference for all purposes.

BACKGROUND

1. Field

The present disclosure is an invention disclosure relating to a method of installing software, a software installation system as well as a corresponding computer program product.

2. Description of the Related Art

To assist users in the installation of software, it is known to use so-called installation wizards that allow users to customize the installation process using a graphical user interface. The installation wizard is typically a special-purpose software that has been specifically developed around the requirements of the software to be installed. The present disclosure expounds upon this background.

BRIEF SUMMARY

The present disclosure teaches a general-purpose software installer that is easily customizable. The software installer receives installation task data representative of a plurality of installation tasks. The installation tasks are categorized into user-unmodifiable installation tasks (these can also be termed "black-box activities" since they may be internal activities or otherwise not prone to user modification/perception) and user-modifiable installation tasks (these can be termed "white-box activities," i.e. activities that can be e.g. reviewed, modified or/and selectively run by a user). On account of the classification of the installation tasks into white-box and black-box activities, the software installer gains recognition of the installation tasks that are open to user interaction. The software installer may then permit a user to simply execute a user-modifiable installation task. The software installer may likewise permit a user to modify a user-modifiable installation task, e.g. by allowing a user to alter the program code associated with the user-modifiable installation task. The software installer may likewise permit a user to simply confirm that the user has carried out appropriate action in lieu of the user-modifiable installation task. As such, the installation process can be easily customized by the user to the fullest degree, i.e. to the user's fullest technical ability. Nonetheless, the user is not exposed to installation tasks that are not prone to user modification.

BRIEF DESCRIPTION OF THE DRAWINGS

FIG. 1 is a schematic drawing showing an embodiment of a software installation system.

DETAILED DESCRIPTION

The embodiments described herein include a general-purpose software installer that is easily customizable. The software installer receives installation task data representative of a plurality of installation tasks. The installation tasks are categorized into user-unmodifiable installation tasks (these can also be termed "black-box activities" since they may be internal activities or otherwise not prone to user modification/perception) and user-modifiable installation tasks (these can be termed "white-box activities," i.e. activities that can be e.g. reviewed, modified or/and selectively run by a user). The classification of the installation tasks into white-box and black-box activities provides the software installer on the installation tasks that are open to user interaction. The software installer may then permit a user to simply execute a user-modifiable installation task. The software installer may likewise permit a user to modify a user-modifiable installation task, such as by allowing a user to alter the program code associated with the user-modifiable installation task. The software installer may likewise permit a user to confirm that the user has carried out appropriate action in lieu of the user-modifiable installation task. As such, the installation process can be easily customized by the user to the fullest degree, such as to the user's fullest technical ability. Nonetheless, the user is not exposed to installation tasks that are not prone to user modification.

The software installer may receive task order data that defines a requisite order of execution of any of the installation tasks relative to any other of the installation tasks. As such, the software installer may ensure that installation tasks that need to be carried out in a specific order are indeed executed in the requisite order. In other words, the software installer may allow the user to modify the order in which the installation tasks are executed, at least to a degree that does not conflict with a requisite order of execution of the installation tasks.

A software installer may be a transforming apparatus that modifies a computer system based on installation task data and, in some embodiments, task order data and/or user input. In one aspect, the present disclosure relates to a method of installing software. In the context of the present disclosure, the term "installing software" may be understood as a fresh installation of software in a computer system and/or as an update of existing software in a computer system. The installation may include a removal of software (e.g. outdated or conflicting software) from a computer system.

FIG. 1 shows an embodiment of a software installation system 100 in accordance with the present disclosure as described above. In the illustrated embodiment, software installation system 100 comprises an installation task data receiving component 102, a task order data receiving component 104, a user input component 106 and an execution component 108. As indicated by arrows in FIG. 1, each of installation task data receiving component 102, task order data receiving component 104 and user input component 106 are in communication with execution component 108 via a data link that allows bidirectional communication of data therebetween. Accordingly, execution component 108 can request and receive data from any of installation task data receiving component 102, task order data receiving component 104 and user input component 106.

The method may comprise receiving installation task data. The installation task data may specify a plurality of installation tasks. In one embodiment, the installation task data may include command data that, when executed on a computer system, effects the plurality of installation tasks on the computer system. The installation task data may include at least one installation command for each of a plurality of installation tasks. The at least one installation command may be a set of one or more commands that, when executed on a computer system, effects the respective installation task. The command data and/or the at least one installation command may be written in any programming language, command language, scripting language or mixture thereof, e.g. in UNIX, Perl, JavaScript, C, etc.

In the context of the present embodiments, the term "installation task" may be understood as any set of actions carried out in the course of installing software on a computer system. Such actions include, but are certainly not limited to, moving data from one directory within or outside the computer system such as from the Internet to another directory within the computer system, modifying data within the computer system, deleting data from the computer system, restarting the computer system, (re)starting a virtual machine (running) on the computer system, (re)launching executable code on the computer system, and the like.

In accordance with the disclosed embodiments, the installation of even a single software package may be split into a plurality of installation tasks. The individual installation tasks may be designated by names that are meaningful to a user. For example, a first installation task may be designated "Move software package to directory 'Applications'" and may comprise moving appropriate data to a specific directory. A second installation task may be designated "Restart computer" and may comprise restarting the computer system. A third installation task may be designated "Confirm installation and archive outdated software" and may comprise running a script that confirms that the software package has been successfully installed and the moves particular data to a specific directory, such as that moves data known to be associated with older versions of the installed software package to a new directory entitled "Archive of previous versions of software XYZ."

The plurality of installation tasks may include at least one user-modifiable installation task and at least one user-unmodifiable installation task. The method may exclude any actions that would modify or allow modification of the command data and/or the at least one installation command associated with the at least one user-unmodifiable installation task. The method may include modifying or allowing modification of the command data and/or the at least one installation command associated with the at least one user-modifiable installation task. For example, the method may include receiving a user input that modifies a destination (e.g. directory or file name) of a data transfer, that modifies which data is to be deleted (e.g. modifies which directory, directories and/or file name(s) is/are to be deleted), that modifies which code is to be executed, that deletes a restart command, that modifies one or more command parameters, etc. The method may include ignoring the command data and/or the at least one installation command associated with the at least one user-modifiable installation task.

In the context of the disclosed embodiments, the expression "receiving of user input" can be understood as receiving user input at any time during execution of the method, e.g. at the outset of the method or immediately prior to an action that makes use of the user input. The user input may be received by obtaining a user response to a plurality of user-selectable options in a graphical user interface. The user input may be received by allowing the user to type commands into a graphical user interface and/or to alter commands of the installation task data presented via the graphical user interface.

The method may comprise receiving task order data that defines a requisite order of execution of any or all of the plurality of installation tasks relative to any other of the plurality of installation tasks. For example, the task order data may specify at least one set of the installation tasks and specify, for each of those sets, the order of execution of the respective set of installation tasks relative to another set of the installation tasks. The order of execution may stipulate that execution of the one set must precede execution of the other set. The order of execution may stipulate that execution of the one set must follow execution of the other set. The order of execution may stipulate that execution of the one set may be carried out in parallel to execution of the other set, i.e. that the order of execution is irrelevant.

For example, the task order data may define one or more sets of installation tasks (of the plurality of installation tasks) that may be carried out in parallel, such as for the order of execution of the installation tasks belonging to the respective set relative to other installation tasks within the set is irrelevant. The task order data may specify a set of installation tasks that must be executed before execution of a respective set of installation tasks that may be carried out in parallel. The task order data may specify a set of installation tasks that may not be executed until after execution of each of the installation tasks belonging to a respective set of installation tasks that may be carried out in parallel.

For example, the task order data may specify an installation task to be carried out first, an installation task to be carried out second, a third and a fourth installation task to be carried out in any order subsequent to completion of the second installation task, and a fifth installation task not to be carried out until both the third and fourth installation tasks have been carried out. The third and fourth installation tasks could be seen as a set of installation tasks that may be carried out in parallel. The first and second installation tasks could be seen as a set of installation tasks that must be executed before execution of the aforementioned set formed by the third and fourth installation tasks. The fifth installation task could be seen as a set of installation tasks that may not be executed until after execution of the aforementioned set formed by the third and fourth installation tasks.

The method may comprise executing one or more or all of the plurality of installation tasks. This executing may be carried out in accordance with the task order data. For example, the executed installation tasks may be executed in accordance with the requisite order defined by the task order data. Where the task order data stipulates a set of installation tasks that may be carried out in parallel, installation tasks belonging to that set may be executed in any order relative to other installation tasks of that set. Naturally, this does not mean that the order of execution of installation tasks belonging to that set relative to installation tasks not belonging to that set is irrelevant. The order of execution of installation tasks belonging to that set relative to installation tasks not belonging to that set may be stipulated by the requisite order.

The aforementioned executing of one or more or all of the plurality of installation tasks may be carried out at least in partial accordance with the installation task data. In the case of user-unmodifiable installation tasks, the installation tasks may be carried out in full accordance with the installation task data. For example, in the case of user-unmodifiable installation tasks, the executing may comprise executing the command data/the at least one installation command associated with the respective user-unmodifiable installation task.

In the case of user-modifiable installation tasks, the executing may comprise (referred to hereinbelow as "option A") executing the command data and/or the at least one installation command associated with the respective user-modifiable installation task.

In the case of user-modifiable installation tasks, the executing may likewise comprise (referred to hereinbelow as "option B") executing a user-altered version of the command data and/or the at least one installation command associated with the respective user-modifiable installation task. More specifically, the executing may comprise receiving a user input, altering the at least one installation command for the respective user-modifiable installation task in accordance with the user input and executing the altered at least one installation command. For example, the command data and/or the at least one installation command associated with the respective user-modifiable installation task may be presented to a user via a graphical user interface. The graphical user interface may comprise facilities allowing the user to effect amendments to the command data and/or the at least one installation command associated with the respective user-modifiable installation task, the graphical user interface triggering execution (e.g. by triggering an installation system or by triggering an installation script) of the amended command data and/or installation command(s) upon confirmation (e.g. receiving an "OK") by the user.

In the case of user-modifiable installation tasks, the executing may moreover comprise (referred to hereinbelow as "option C") simply receiving a user input indicating that the user has taken action in lieu of execution of the command data and/or the at least one installation command associated with the respective user-modifiable installation task. More specifically, the executing may comprise receiving a user input indicative of execution of at least one other installation command in lieu of the at least one installation command for the respective user-modifiable installation task.

The method may comprise receiving a selecting user input and selecting, in the case of user-modifiable installation tasks, how the aforementioned executing is to be carried out based on the selecting user input. For example, the method may comprise selecting, based on the selecting user input, whether the aforementioned executing is to be carried out in accordance with option A, option B or option C as described above.

The receiving of a selecting user input and the selecting of how the executing is to be carried out may be effected for individual user-modifiable installation tasks. In one embodiment, each instance of receiving and selecting may relate to just one individual installation task. In this respect, the method may comprise allowing a user to select user-modifiable installation tasks for which the receiving and selecting is to be effected on a once per installation task basis. The receiving of a selecting user input and the selecting of how the executing is to be carried out may likewise be performed for a group of user-modifiable installation tasks.

The method may comprise allowing a user to choose a group of user-modifiable installation tasks for which the installation tasks are to be executed in accordance with a common selecting user input. For example, the user may choose a set of user-modifiable installation tasks and then choose that the set of installation tasks be executed by option A, such as by executing the command data and/or the at least one installation command associated with each respective one of the user-modifiable installation tasks belonging to the set.

The method may comprise receiving an execution order user input specifying an order of execution of any of the user-modifiable installation tasks relative to any other of the installation tasks. For example, the execution order user input may specify at least one set of the user-modifiable installation tasks and specify, for each of those sets, the order of execution of the respective set of user-modifiable installation tasks relative to another set of the installation tasks. The order of execution may stipulate that execution of the one set must precede execution of the other set. The order of execution may stipulate that execution of the one set must follow execution of the other set. The order of execution may stipulate that execution of the one set may be carried out in parallel to execution of the other set, such as that the order of execution is irrelevant.

The executing of one or more or all of the plurality of installation tasks may be carried out in accordance with the execution order user input. To the respect that the method comprises executing of one or more or all of the plurality of installation tasks in accordance with the requisite order defined by the task order data, the requisite order may have priority over the execution order user input. In other words, the executing of one or more or all of the plurality of installation tasks may be carried out in accordance with the execution order user input, excepting to the respect that the execution order user input conflicts with the requisite order, such as unless the execution order user input violates the requisite order. To avoid such conflict, the receiving of an execution order user input may comprise restricting the execution order user input to an execution order user input that does not violate the requisite order. This may be accomplished by discarding execution order user inputs that violate the requisite order. Furthermore, the receiving of an execution order user input may comprise presenting a user with a list of installation tasks that are open for execution, for example for which execution all prerequisites have been fulfilled at the current stage of the method, and receiving a user input that specifies which installation task should be executed next.

While the teachings of the present disclosure have been discussed hereinabove in the form of a method, the teachings may be embodied, mutatis mutandis, in the form of a system, such as a software installation system, and/or a computer program product, as will be appreciated by the person skilled in the art. The software installation system may be configured and adapted to affect any of the actions described above with respect to the disclosed method.

The software installation system may comprise an installation task data receiving component that receives installation task data as discussed hereinabove. The software installation system may comprise task order data receiving component that receives task order data as discussed hereinabove. The software installation system may comprise an execution component that executes installation tasks as discussed hereinabove. The software installation system may comprise a user input component that receives a user input, such as a selecting user input and/or an execution order user input, as discussed hereinabove.

As will be appreciated by one skilled in the art, aspects of the present embodiments may be a system, method and/or computer program product. Accordingly, aspects of the present embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in computer readable storage medium having computer readable program code embodied thereon.

Any combination of one or more computer readable medium may be utilized. The computer readable medium may be a computer readable signal medium or a computer readable storage medium. A computer readable medium maybe, for example, but not limited to, an electronic, magnetic, optical, electromagnetic, infrared, or semiconductor system, apparatus, or device, or any suitable combination of the foregoing. More specific examples, a non-exhaustive list, of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described with reference to flowchart illustrations and/or block diagrams of methods, apparatus (systems) and computer program products according to embodiments of the present disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The block diagrams in the Figures illustrate the architecture, functionality, and operation of possible implementations of systems, methods and computer program products according to various embodiments of the present disclosure. In this regard, each block in the block diagrams may represent a module, segment, or portion of code, which comprises one or more executable instructions for implementing the specified logical function(s). It should also be noted that, in some alternative implementations, the functions discussed hereinabove may occur out of the disclosed order. For example, two functions taught in succession may, in fact, be executed substantially concurrently, or the functions may sometimes be executed in the reverse order, depending upon the functionality involved. It will also be noted that each block of the block diagrams, and combinations of blocks in the block diagrams, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for installing software, comprising:
receiving, by use of a processor, installation task data for a plurality of installation tasks comprising at least one user-modifiable installation task and at least one user-unmodifiable installation task, wherein each user-modifiable installation task and each user-unmodifiable installation task comprises at least one installation command, wherein the at least one user-modifiable installation task comprises an archive of previous versions of software command;
receiving task order data defining a requisite order of execution of the plurality of installation tasks;
receiving a modification to an installation task of the plurality of installation tasks;
discarding the modification if the modification is to an installation command of a user-unmodifiable installation task;
discarding the modification if the modification violates the task order data; and
executing the modification if the modification is to an installation command of a user modifiable installation task and does not violate the task order data.

2. The method of claim 1, wherein executing each user-modifiable installation task comprises executing the at least one installation command for the user-modifiable installation task.

3. The method of claim 1, wherein executing the user-modifiable installation task comprises executing at least one other installation command in lieu of the at least one installation command for the user-modifiable installation task in response to a second user input.

4. The method of claim 3, further comprising receiving a selecting user input selecting one of the first user input and the second user input.

5. The method of claim 1, further comprising receiving an execution order user input specifying an order of execution of a first user-modifiable installation task relative to the plurality of installation tasks, wherein the executing of the plurality of installation tasks is effected in accordance with the execution order user input unless the execution order user input violates the requisite order.

6. The method of claim 5, further comprising restricting the execution order user input to an execution order user input that does not violate the requisite order.

7. A computer program product for installing software, the computer program product comprising a non-transitory computer readable storage medium having program code embodied therein, the program code readable/executable by a processor to:
receive installation task data for a plurality of installation tasks comprising at least one user-modifiable installation task and at least one user-unmodifiable installation task, wherein each user-modifiable installation task and each user-unmodifiable installation task comprises at least one installation command, wherein the at least one user-modifiable installation task comprises an archive of previous versions of software command;
receive task order data defining a requisite order of execution of the plurality of installation tasks;
receive a modification to an installation task of the plurality of installation tasks;
discard the modification if the modification is to an installation command of a user-unmodifiable installation task;
discard the modification if the modification violates the task order data; and
execute the modification if the modification is to an installation command of a user modifiable installation task and does not violate the task order data.

8. The computer program product of claim 7, wherein executing each user-modifiable installation task comprises executing the at least one installation command for the user-modifiable installation task.

9. The computer program product of claim 7, wherein executing the user-modifiable installation task comprises executing at least one other installation command in lieu of the at least one installation command for the user-modifiable installation task in response to a second user input.

10. The computer program product of claim 9, the program code further causing receiving a selecting user input selecting one of the first user input and the second user input.

11. The computer program product of claim 7, the program code further causing receiving an execution order user input specifying an order of execution of a first user-modifiable installation task relative to the plurality of installation tasks, wherein the executing of the plurality of installation tasks is effected in accordance with the execution order user input unless the execution order user input violates the requisite order.

12. The computer program product of claim 11, the program code further causing restricting the execution order user input to an execution order user input that does not violate the requisite order.

13. A system comprising:
a non-transitory computer readable storage medium having program code embodied therein, the program code executable by a processor and comprising:
an installation task data receiving component receiving installation task data for a plurality of installation tasks comprising at least one user-modifiable installation task and at least one user-unmodifiable installation task, wherein each user-modifiable installation task and each user-unmodifiable installation task comprises at least one installation command, wherein the at least one user-modifiable installation task comprises an archive of previous versions of software command;
a task order receiving component receiving task order data defining a requisite order of execution of the plurality of installation tasks;
a user input component receiving a modification to an installation task of the plurality of installation tasks;
an execution component discarding the modification if the modification is to an installation command of a user-unmodifiable installation task, discarding the modification if the modification violates the task order data, and executing the modification if the modification is to an installation command of a user modifiable installation task and does not violate the task order data.

14. The system of claim 13, wherein executing each user-modifiable installation task comprises executing the at least one installation command for the user-modifiable installation task.

15. The system of claim 13, wherein executing the user-modifiable installation task comprises executing at least one other installation command in lieu of the at least one installation command for the user-modifiable installation task in response to a second user input.

16. The system of claim 15, further comprising a user input component receiving a selecting user input selecting one of the first user input and the second user input.

17. The system of claim 13, the user input component further receiving an execution order user input specifying an order of execution of a first user-modifiable installation task relative to the plurality of installation tasks, wherein the executing of the plurality of installation tasks is effected in accordance with the execution order user input unless the execution order user input violates the requisite order.

18. The system of claim 17, further comprising restricting the execution order user input to an execution order user input that does not violate the requisite order.

19. A method for deploying a computer program product, comprising integrating program code into a computing system, wherein the code in combination with the computing system performs the following:
- receiving installation task data for a plurality of installation tasks comprising at least one user-modifiable installation task and at least one user-unmodifiable installation task, wherein each user-modifiable installation task and each user-unmodifiable installation task comprises at least one installation command, wherein the at least one user-modifiable installation task comprises an archive of previous versions of software command;
- receiving task order data defining a requisite order of execution of the plurality of installation tasks; and
- receiving a modification to an installation task of the plurality of installation tasks;
- discarding the modification if the modification is to an installation command of a user-unmodifiable installation task;
- discarding the modification if the modification violates the task order data; and
- executing the modification if the modification is to an installation command of a user modifiable installation task and does not violate the task order data.

20. The method of claim 19, wherein executing the user-modifiable installation task comprises executing at least one other installation command in lieu of the at least one installation command for the user-modifiable installation task in response to a second user input.

* * * * *